United States Patent [19]

Carney et al.

[11] Patent Number: 4,607,664
[45] Date of Patent: Aug. 26, 1986

[54] PLUMBING TEST PLUG APPARATUS

[76] Inventors: Joseph H. Carney, 13495 Meyer Rd., Whittier, Calif. 90605; Rudy Lozano, 1537 Leanne Ter., Walnut, Calif. 91789

[21] Appl. No.: 787,152

[22] Filed: Oct. 15, 1985

[51] Int. Cl.⁴ .............................................. F16K 17/36
[52] U.S. Cl. ....................................... 138/89; 137/67; 137/68.1; 220/89 A; 285/3
[58] Field of Search ..................... 138/89, 90, 94; 73/49.8; 137/67, 68.1, 72; 222/541; 166/317, 192; 220/89 A, 89 B, 265, 277; 285/3, 235, 236

[56] References Cited

U.S. PATENT DOCUMENTS

| 1,739,067 | 12/1929 | Fleming | 138/89 |
| 2,106,996 | 2/1938 | Edwards | 138/89 |
| 2,330,564 | 9/1943 | Dyer | 166/317 |
| 2,545,504 | 3/1951 | Villafane | 138/89 |
| 2,778,376 | 1/1957 | Chester | 137/67 |
| 3,209,732 | 10/1965 | Laken | 137/67 |
| 3,310,615 | 3/1967 | Bender | 138/89 |
| 3,472,253 | 10/1969 | Herscher et al. | 137/67 |
| 3,496,952 | 2/1970 | Amendola | 137/67 |
| 3,860,038 | 1/1975 | Forni | 285/236 |
| 3,915,235 | 10/1975 | Hamilton et al. | 137/68.1 |
| 3,982,723 | 9/1976 | Ford et al. | 285/236 |
| 4,101,151 | 7/1978 | Ferguson | 285/236 |
| 4,102,469 | 7/1978 | Shegrud et al. | 137/68.1 |
| 4,114,653 | 9/1978 | Carlin | 138/89 |
| 4,257,628 | 3/1981 | Petersen | 285/3 |
| 4,357,960 | 11/1982 | Han | 138/97 |

FOREIGN PATENT DOCUMENTS

| 931184 | 7/1973 | Canada | 285/3 |
| 2100349 | 12/1982 | United Kingdom | |

Primary Examiner—Stephen Marcus
Assistant Examiner—Leo James Peters
Attorney, Agent, or Firm—Jack C. Munro

[57] ABSTRACT

A plug to be temporarily located in a blocking manner within a pipe of a sewage pipe system of a building. The plug is to be installed within the pipe system as it is constructed. The plug is mounted within a flexible, enclosing wall, sleeve. The plug is constructed to be frangible and totally dissolvable within water. A clamping device is mounted exteriorly on the sleeve directly in the area of the plug. When the plug is no longer needed, the clamping device is operated to effect breaking of the plug and then disposing of the plug through the pipe system.

10 Claims, 5 Drawing Figures

U.S. Patent  Aug. 26, 1986  4,607,664
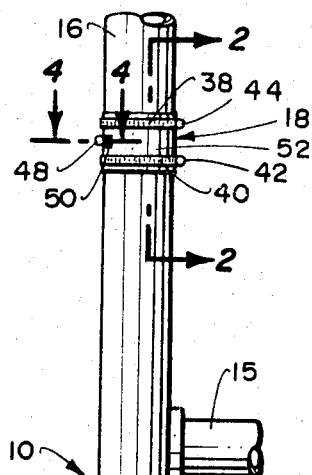
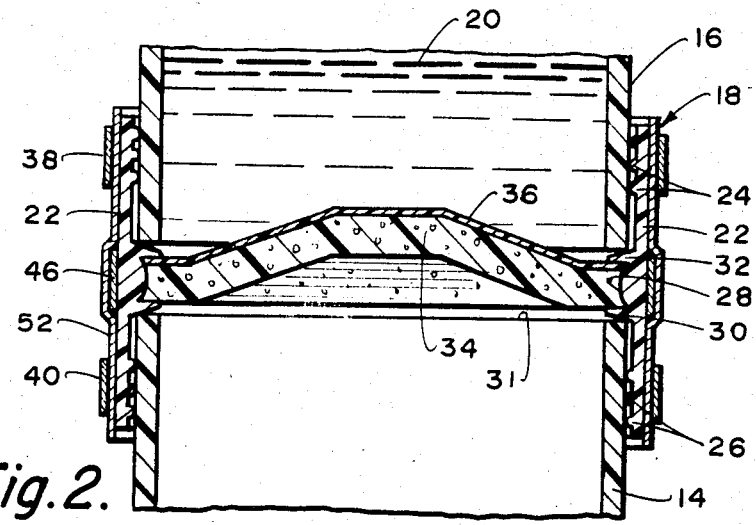
Fig. 2.
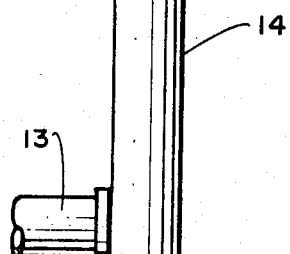
Fig. 3.
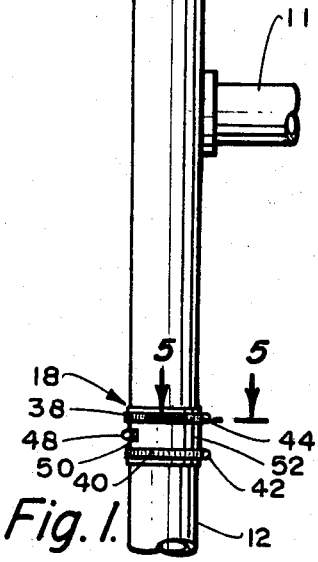
Fig. 1.
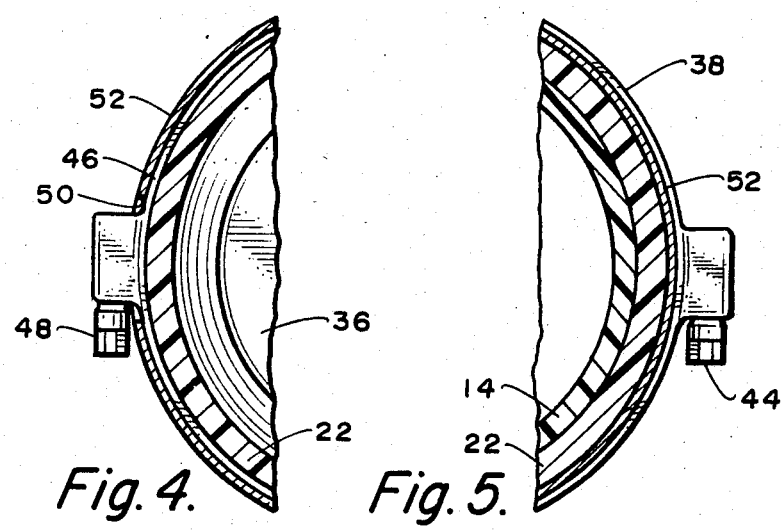
Fig. 4.  Fig. 5.

PLUMBING TEST PLUG APPARATUS

BACKGROUND OF THE INVENTION

The field of this invention relates to plumbing and more particularly to a device which is to be temporarily installed within a plumbing system of a building structure to permit testing to insure that all the piping connections within the plumbing system are connected in a fluid-tight manner.

In the constructing of any plumbing system within a building or home, it is required by most city and county codes that the plumbing system be tested to make sure that it is leak free. For example, if a multi-story office building is being built, every so many feet in height of the building, it is required to test the plumbing for any possible leaks. The common procedure is to install at an appropriate lower location with the plumbing a specially configured section of pipe which is defined as a "Y" section. The "Y" section has a short outwardly extending pipe which is normally closed. When it is required to test the pipe system, the plumber will open this short section of pipe and install an inflatable bladder within the pipe and inflate such to tightly close off the discharge outlet of the pipe system. The plumber then goes to the topmost pipe of the pipe system, that is open, and fills such with water. The plumber then applies pressure to the required level, such as fifty pounds per square inch, and then observes if there are any leaks within any portion of the piping system. The inflatable bladder prevents escape of the water. If there are no leaks, the plumber then deflates the bladder and removes such which causes the water to escape and be discharged within appropriate sewer located exteriorly of the building.

Within a forty or fifty story building it is required that there be a substantial number of these "Y" sections installed. Each "Y" section is expensive and once it is used to effect testing of the system, the "Y" section is never used again. Also, this separate conduit from the "Y" section may provide for a collecting station for debris which can result in clogging of the plumbing system. It would be desirable to construct some form of a testing assembly which eliminated the use of such a "Y" with only a normal connection arrangement being employed between the different sections of pipe.

SUMMARY OF THE INVENTION

The structure of the present invention includes a flexible band assembly mounted exteriorly about a pair of in-line located sections of pipe each of which have open ends are located substantially adjacent one another. Tightening bands are mounted exteriorly about a flexible enclosing sleeve and are used to tightly secure the sleeve to each of the sections of pipe. Mounted within the interior portion of the sleeve is an annular groove which is located between the sections of pipe. Within that annular groove is supported a plug. This plug is constructed to be easily breakable by the applying of a circumferential force. The plug is also constructed to eventually be completely dissolvable within water. The applying of the circumferential force is through the use of a clamping band which is mounted on the exterior surface of the sleeve in the area of the gap between the sections of pipe. The plug functions to prevent passage of water from one pipe section to another pipe section in order to permit the achieving of the desired test. Once the test has been obtained, the clamping band is operated to break the frangible plug and the broken parts of the plug are then discharged through the sections of pipe to be eventually dissolved within a sewer system.

The primary objective of the present invention is to construct a testing arrangement for a plumbing system which can achieve the testing at a substantially decreased cost than was heretofore possible and can also be achieved in a substantially easier manner than was heretofore possible.

BRIEF DESCRIPTION OF THE DRAWING

FIG. 1 is an elevational view of a typical plumbing pipe system within which the subject matter of the present invention is to be utilized;

FIG. 2 is a longitudinal cross-sectional view taken along line 2—2 of FIG. 1 showing the plug in the unbroken configuration;

FIG. 3 is a cross-sectional view, similar to FIG. 2, but showing the plug in the broken configuration;

FIG. 4 is a partial, transverse, cross-sectional view through the plug apparatus of this invention showing the plug in the unbroken state; and FIG. 5 is a partial, transverse, cross-sectional view through another portion of the plug apparatus of this invention, again showing the plug in the unbroken state.

DETAILED DESCRIPTION OF THE SHOWN EMBODIMENT

Referring to the drawing, there is shown in FIG. 1 a discharge outlet pipe of a pipe system 10 that is to be incorporated within the plumbing of a conventional building. The system 10 is shown composed of a pipe 12, a pipe 14 and a pipe 16 which are generally located in a vertical position. Connecting pipes, such as pipes 11, 13 and 15 are shown connecting with pipe 14 and are to function to discharge their contents into pipe 14 which in turn is conducted into pipe 12 and hence to eventually be deposited exteriorly of the building within an appropriate sewer line. The pipe 16 is essentially identical to pipe 14 which is also essentially identical to pipe 12.

It is to be understood that human waste products and water are to be deposited within the pipes 11, 13 and 15 which are then disposed of within the pipe 14. There may be a substantially greater number of connecting pipes, such as pipes 11, 13 and 15, connecting with pipe 14 or there may be a lesser number. It is important that the pipe 14 constitutes the only outlet line from the building for pipes 11, 13 and 15. It is to be understood that pipes similar to 11, 13 and 15 will also be connected to pipe 16 and may or may not be connected to pipe 12 depending upon whether pipe 12 is located at the bottom floor of the building or at a higher elevation.

In order to connect together the pipes 12 and 14, and also connect together pipes 14 and 16, there is utilized the plug apparatus 18 of the present invention. This plug apparatus 18 provides for a flexible, rubber, enclosing sleeve 22 which has within its interior surface a plurality of annular ridges 24 located at one end thereof and a similar pair of ridges 26 located at the opposite end thereof. Referring particularly to FIG. 2 of the drawing it is shown that the ridges 24 are in direct contact with the exterior surface of the pipe 16 with the ridges 26 being in direct contact with the exterior surface of the pipe 14. It is to be noted that within FIGS. 2 and 3 the discussion is directed to plug apparatus 18 which is used to connect only the pipes 16 and 14. However, it is cansidered to be within the scope of this invention that the description also applies to plug apparatus 18 that connects together pipes 14 and 12.

Mounted in a close conforming manner about the exterior surface of the sleeve 22 is a rigid walled split band 52. This split band 52 will normally be constructed of metal. The band 52 has a pair of ends (not shown) which overlap each other.

Mounted on the exterior surface of the split band 52 are a pair of spaced-apart clamping bands 38 and 40. Band 38 is located directly adjacent annular ridges 24 while the band 40 is located directly adjacent the annular ridges 26. Connecting with the clamping band 38 is a worm gear type of fastener arrangement 44 with a similar worm gear fastener arrangement 42 being associated with the band 40. Construction of the bands 38 and 40 is deemed to be conventional and constitutes a readily available commercially marketable item which is commonly sold as a "hose clamp".

With the sleeve 22 located in position as shown in FIG. 2 of the drawing, operation of the worm gear fastener 44, as by means of a conventional screwdriver, exerts a clamping action depressing ridges 24 tightly against the exterior surface of the pipe 16. In a similar manner the worm gear fastener 42 is operated to depress the ridges 26 tightly against the exterior surface of the pipe 14. As the bands 38 and 40 are tightened, the ends of the split band 52 will merely slide with respect to each other enclosing a decreasing confined area. The fasteners 42 and 44 are to be manually operated until the sleeve 22 is tightly retained in a fluid-tight manner between the pipe sections 14 and 16.

It is to be noted that the pipe sections 14 and 16 are located in a slightly spaced manner forming a gap 31 therebetween. Within the gap 31 is located an annular groove 28 formed within the interior surface of the sleeve 22. The annular groove 28 is defined between annular ridges 30 and 32. The ridges 30 and 32 are also constructed of the same material as sleeve 22 which will normally be rubber.

The size of the annular groove 28 is so as to snugly retain the peripheral edge of a plug 34. The plug 34 assumes a frusto-conical configuration and, with respect to the upstream side of the pipe system 10, assumes a convex configuration. The upstream side of the pipe system 10 is the side within which is located the water 20. The convex configuration is such that the force of the water 20 against the plug 34 has a tendency, because of the convex configuration of plug 34, to push the peripheral surface of the plug 34 into fluid-tight connection with the annular groove 28. This is so as to prevent any leakage of the water 20 past the plug 34 during the testing procedure. The plug 34 is to be constructed of a dissolvable material. An example of a dissolvable material would be a composition of soybean flour, sugar and a bicarbonate or baking soda. However, it is to be considered to be within the scope of this invention that other materials for construction of the plug 34 could be utilized as long as it would be dissolvable over a period of time within water.

In order to prevent immediate dissolving of the plug 34 by the water 20, normally the surface of the plug 34 that is in direct contact with the water 20 is to be coated with a coating 36. The structure of the coating 36 is to be of a material which is dissolvable within water but is slowly dissolvable. An example of such a coating would be a grease. Again, the composition of the coating 36 is so that it takes several hours before the coating dissolves within the water.

Mounted directly onto the sleeve 22 and interiorly of the split band 52 is a clamping bead 46. Clamping band 46 is similar to bands 38 and 40. The position of the band 46 is to be directly adjacent to annular groove 28 but of course is mounted on the exterior surface of the sleeve 22. The band 46 is connected to a worm gear fastener 48 which is to be operated by a conventional screwdriver in a manner similar to operating of worm gear fasteners 42 and 44. The worm gear fastener 48 protrudes exteriorly through an opening 50 formed within the split band 52.

During construction of the pipe system 10, the plumber mounts the clamping bands 38 and 40 and sleeve 22 at appropriate desired locations on the pipe system 10. During this installation the plug 34 has already been installed within the annular groove 28. In order to achieve the permanent installation of the plug apparatus 18 of this invention, the plumber only needs to tighten the clamping bands 38 and 40 the desired amount to acieve the purpose of fixing the apparatus 18 to the pipes 14 and 16.

Once the apparatus 18 is permanently affixed, the plug 34 remains intact until the plumber decides it is time to perform the test procedure. In performing of the test procedure, the plumber fills the pipe system 10 to be tested located above the plug 34 with water 20. The open ends of the connecting pipes 11, 13 and 15 have been closed. The plumber then proceeds to exert the pressure against the water 20 to at least fifty pounds per square inch. If no leaks become apparent, the plumber then proceeds to tighten the worm fastener 48. As the worm fastener is tightened, the flexible sleeve 22 deflects inwardly applying pressure against the peripheral edge of the plug 34 due to the enclosing movement of band 46. At a time when a sufficient amount of pressure has been applied, the plug 34 will break into several pieces to be conducted by the rush of the water 20 through the pipe system 10 to be disposed of into the sewer system.

After the plug 34 has broken, it is generally preferred that the clamping band 46 remain in its established position which will cause the portion of the sleeve 22 to fill a portion of the gap area between the thickness of the walls of the pipes 14 and 16. As a result, a somewhat smooth surface is achieved between the pipes 14 and 16 across the gap 31 so as to minimize the possibility of any type of debris getting caught by this section of the sleeve 22 located within this gap area as the material is being conducted through the pipe system 10.

What is claimed is:

1. A plug apparatus for temporarily blocking the discharge fluid flow path of a pipe system comprising:
   a first pipe and a second pipe located in an in-line manner through which a fluid is to be conducted, both said first pipe and said second pipe having an open end, said open ends being located directly adjacent but spaced therefrom forming a gap;
   a flexible walled sleeve exteriorly mounted on both said first and second pipes and extending across said gap, said sleeve having an exterior wall surface and an interior wall surface, means formed on said interior wall surface for securing a plug;
   said plug locatable within said sleeve, said plug completely blocking said flow path between said first and second pipes said plug being destructable, said plug being held in position by said hiatus means;

a first clamping means mounted on said exterior surface of said sleeve for securing said sleeve onto said first pipe and said second pipe in a fluid-tight manner; and a second clamping means mounted on said exterior surface of said sleeve for applying a force to said plug.

2. The plug apparatus as defined in claim 1 wherein: said plug being destructible by being frangible.

3. The plug apparatus as defined in claim 2 wherein: said plug being constructed of a material that is completely dissolvable within water.

4. The plug apparatus as defined in claim 3 wherein: said plug when viewed from the upstream section of said pipe system having a convex configuration, whereby as pressure is applied to the surface of said plug the pressure has a tendency to tightly press the periphery of said plug into said sleeve so as to insure the establishment of a fluid-tight connection between said plug and said sleeve.

5. The plug apparatus as defined in claim 4 wherein: said means for securing said plug comprising an annular groove, the periphery of said plug being located within said annular groove.

6. The plug apparatus as defined in claim 5 wherein: said sleeve being constructed of rubber.

7. The plug apparatus as defined in claim 6 wherein: said first clamping means including a split band substantially completely covering said sleeve, a pair of spaced-apart clamping bands being mounted on said split band, said clamping bands being operable to tightly secure said sleeve on said first and second pipes in a fluid-tight manner.

8. The plug apparatus as defined in claim 7 wherein: said second clamping means comprising a clamping device which when tightened decreases the diameter of said sleeve about said plug until said plug breaks.

9. The plug apparatus as defined in claim 2 wherein: said second clamping means comprising a clamping device which when tightened decreases the diameter of said sleeve about said plug until said plug breaks.

10. The plug apparatus as defined in claim 4 wherein: the upstream side of said plug being coated with a substance to slow the dissolving of said plug.

* * * * *